A. W. CASH & C. RORABECK.
PIPE UNION.
APPLICATION FILED JUNE 14, 1909.
962,075.
Patented June 21, 1910.
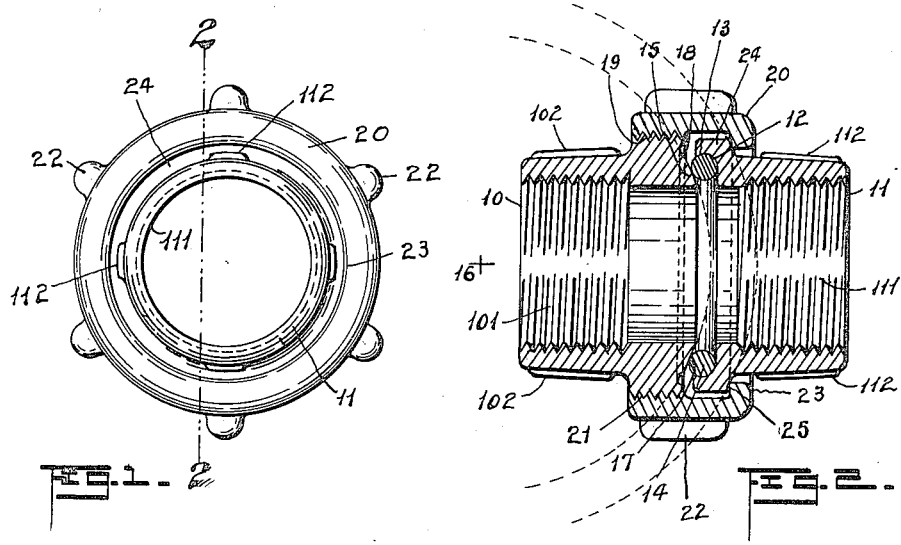
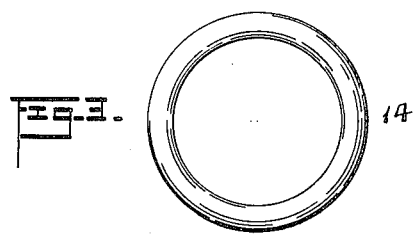
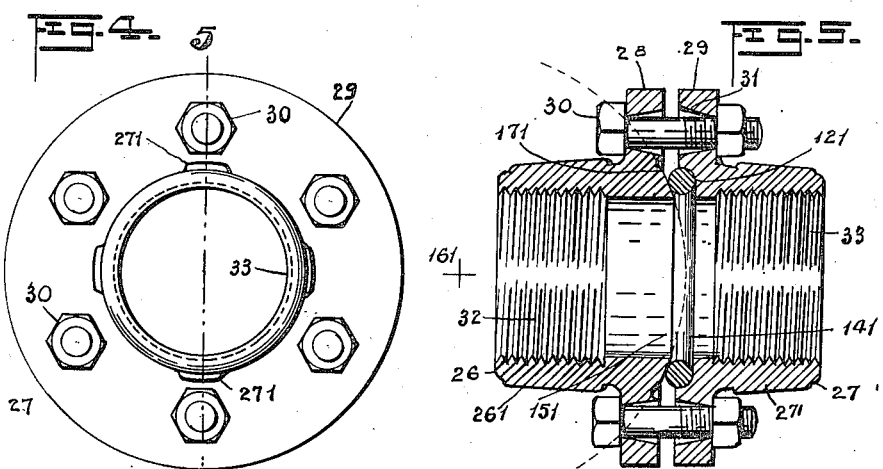
WITNESSES
Frederick Germann Jr.
Frances M. Blodgett.
INVENTORS
Arthur W. Cash
Claude Rorabeck,
BY
Russell M. Everett,
ATTORNEY.

UNITED STATES PATENT OFFICE.

ARTHUR W. CASH, OF NEWARK, NEW JERSEY, AND CLAUDE RORABECK, OF NEW YORK, N. Y.

PIPE-UNION.

962,075.  Specification of Letters Patent.  Patented June 21, 1910.

Application filed June 14, 1909. Serial No. 501,946.

*To all whom it may concern:*

Be it known that we, ARTHUR W. CASH and CLAUDE RORABECK, citizens of the United States, residing at (1) Newark, in the county of Essex and State of New Jersey, and (2) New York city, in the borough of Manhattan and State of New York, have invented certain Improvements in Pipe-Unions, of which the following is a specification.
This invention relates to unions for connecting the adjacent ends of lengths of iron piping or the like, and the objects of the invention are to obtain a union which shall give a tight and impervious connection even though the adjacent pipe sections are out of exact alinement; to enable the coupling members of the union to shift with respect to each other, so that their threaded engagements with the pipe sections shall not be strained; to provide for such shifting without affecting impervious engagement of said members with each other; to obtain a simple and inexpensive construction, involving but little labor in its manufacture and yet attaining perfect results, and to obtain other advantages and results as may be brought out in the following description.

Referring to the accompanying drawings, in which like numerals of reference indicate corresponding parts in each of the several figures, Figure 1 is an end view of a coupling or union of our improved construction; Fig. 2 is a longitudinal section of the coupling, taken on line 2—2 of Fig. 1; Fig. 3 shows a certain seat ring which forms a part of the union; Fig. 4 is an end view of a modified construction of union, and Fig. 5 is a longitudinal section of the same on line 5—5 of Fig. 4.
In said drawings, referring especially to Figs. 1, 2 and 3, 10 and 11 indicate the male and female members, respectively, of my improved union. These members are at their opposite ends each interiorly threaded, as at 101, 111, and provided at their exteriors with longitudinal ribs 102, 112, so that said members can be screwed onto the adjacent ends of two pipe sections or lengths, as will be understood.
At its end next the male member, the female member 11 has a recess 12 extending radially outward from the central longitudinal passage of the member and also open at the end of the member. Said recess 12 is at its outer wall curved in cross section on the arc of a circle whose center lies in from the end of the member, so that said outer wall is somewhat undercut, as at 13. A ring 14, preferably of circular cross-section, is seated in the said recess 12, being expanded against the said overhanging wall 13 thereof so as to be retained in place. At the same time, the outer side of the ring 12 projects beyond the plane of the inner end of the member 11, as clearly shown in Fig. 2.

The male member 10 has at its end next the female member, a reduced extension 15 around the central longitudinal passage of the member, the outer wall of said extension being beveled rearwardly in the surface of a sphere whose center lies in the central axial line of the coupling member near the outer end of the member, as at 16. This surface 17 of the reduced extension is adapted to engage the ring 14 when the coupling members are brought together, said extension partially entering the said ring, as shown in Fig. 2. At the lower outer edge of the contact surface 17 is a groove 18 bounding the said surface and from which the end of the coupling member extends radially outward, so that sufficient clearance is provided between the ends of the coupling members as distinguished from the ring 14 and the reduced extension 15. Adjacent to its said reduced extension 15, the male coupling member 10 is exteriorly threaded, as at 19, to receive a sleeve 20 having an interior thread 21 to engage the thread 19 and having exterior longitudinally projecting lugs 22 to facilitate turning either by being struck upon their sides or by offering a hold for a wrench applied to the sleeve. The other end of the said sleeve 20 has an inwardly projecting flange 23 which is adapted to reach in over an exterior flange 24 at the adjacent end of the female coupling member 11, as shown in Fig. 2. The engaging surface of the said flange 24 is convexly curved in the surface of a sphere also having its center at 16, so that the said surface 25 and the outer surface 17 of the reduced extension 15 of the male member 10 are concentric. The flange 23 of the sleeve 20 simply hooks over onto the said spherical surface, and preferably engages it with as little surface of contact as is practicable.

By the construction above described, it is obvious that the two coupling members 10 and 11 may have a bending or hinge motion upon each other without disturbing their impervious engagement, and which permits of automatic adjustment when connecting two sections or lengths of pipe which are not in exact alinement. This bending of the coupling, or motion of one coupling member upon the other, is limited only by the width of the curved surfaces 17 and 25 and the space provided between the sleeve 20 and female member 12, but in practice these need not be very great to allow for all the deflection that is required in ordinary pipe fitting.

The ring 14 is of softer material than the reduced extension 15 with which it comes in contact, and is preferably copper, although any other soft material which would produce an equivalent effect might of course be employed. The cross-sectional shape of the ring 14 is such as will produce what is known as a line contact with the spherical surface of the reduced extension 15, and this is most conveniently done by making the ring of a circular wire or rod. Other shapes might be employed, however, without departing from the scope of the invention. By reason of its softness the said ring 14 is very readily expanded into its seat so as to remain permanently therein, and furthermore, said softness enables a crushed joint to be secured between the ring and spherical surface by forcing the two members of the union together. There being a line contact between said ring and spherical surface, obviously very little pressure will secure an impervious joint, even though there be inaccuracies in the machining of said spherical surface of the female member. Indeed, if the spherical surface was not machined at all, and had the smoothness of a good casting, an impervious joint would be secured in my improved union upon bringing the two members together by screwing or by hitting one of them with a hammer. We prefer, however, that the spherical surface 17 of the reduced extension 15 be machined, and then upon a second coupling of the members of the union together, an impervious joint is secured even though the ring has been rotated with respect to its seat. The coupling is very easily and cheaply manufactured and is very accurate and efficient in use.

In Figs. 4 and 5, we have shown our invention adapted to a union in which the two members 26 and 27 are connected by radially projecting flanges 28 and 29 at their adjacent ends, which flanges receive clamping bolts 30, the holes for said bolts being tapered at their adjacent ends, at 31, to allow for a swinging of the two members 26 and 27 out of alinement with each other. Aside from this different means of connection or clamping together, the coupling members are constructed the same as shown in Figs. 1, 2 and 3 and previously described, having interior threads 32 and 33 to engage pipe ends and one having a ring 141 seated in a recess 121 and adapted to engage by a line contact the outer tapering surface 171 of a reduced extension 151 on the other member, said surface being curved on a sphere whose center is at 161. These coupling members also have exterior ribs 261 and 271 for turning.

Having thus described the invention, what we claim is—

1. In a pipe union, the combination of male and female members having their opposite ends adapted to engage pipe sections, one of the inner adjacent ends of said members having a convex spherical seat, a ring upon the other inner adjacent end of softer metal than said spherical seat and presenting thereto an annular portion of convexly curved cross-section adapted to engage the seat in line contact, means for holding said ring in a fixed plane on its member with its outer side exposed to said convex spherical seat of the other member and its inner annular surface exposed to the flow passage of its member, and means for clamping said male and female members together.

2. In a pipe union, the combination of male and female members having their opposite ends adapted to engage pipe sections, the adjacent ends of said members having one a convex spherical seat and the other a flange having at its front side an annular bearing of convexly-curved cross-section exposed at its front to said convex spherical seat of the other member and at its inner annular surface to the flow passage of its member and said flange having at its other or rear side a spherical bearing concentric with said seat, and a sleeve having a flanged end adapted to engage said spherical bearing, said sleeve adapted at its other end to engage the member having said spherical seat.

3. In a pipe union, the combination of male and female members having their opposite ends adapted to engage pipe sections, the adjacent ends of said members having one a spherical seat and the other a flange with a spherical bearing concentric with said seat at the side of said flange away from said seat, a ring upon the other side of said flange having an annular portion of convexly curved cross-section projecting therefrom and adapted to engage the spherical seat, the inner annular surface of said ring being adjacent to the flow passage of the flanged member and exposed thereto, and a sleeve having a flanged end adapted to engage said spherical bearing, said sleeve adapted at its other end to engage the member having said spherical seat.

4. In a pipe union, the combination of male and female members having their opposite ends adapted to engage pipe sections, the adjacent ends of said members having one a spherical seat and the other a flange with a spherical bearing concentric with said seat at the side of said flange away from said seat, a ring upon the other side of said flange having an annular portion of convexly curved cross-section projecting therefrom and adapted to engage the spherical seat, means for holding said ring in a fixed plane on said flange with its outer side exposed to said convex spherical seat of the other member and its inner annular surface exposed to the flow passage of its member, and a sleeve having a flanged end adapted to engage said spherical bearing, said sleeve adapted at its other end to engage the member having said spherical seat.

5. In a pipe union, the combination of male and female members having their opposite ends adapted to engage pipe sections, the adjacent ends of said members having one a convex spherical seat and the other a flange with a circular line contact at one side adapted to engage said seat and a spherical bearing at the other side concentric with said seat, and a sleeve having a flanged end with a circular line contact adapted to engage said spherical bearing, said sleeve adapted at its other end to engage the member having said spherical seat.

ARTHUR W. CASH.
CLAUDE RORABECK.

In the presence of—
HARVEY E. MILLER,
PAULINE MILLER.